United States Patent
Katsu (10) Patent No.: US 10,675,864 B2
(45) Date of Patent: Jun. 9, 2020

(54) PRINTING APPARATUS AND PRINT CONTROL METHOD

(71) Applicant: CANON KABUSHIKI KAISHA, Tokyo (JP)

(72) Inventor: Takuji Katsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/170,453

(22) Filed: Oct. 25, 2018

(65) Prior Publication Data

US 2019/0126610 A1    May 2, 2019

(30) Foreign Application Priority Data

Nov. 1, 2017 (JP) ................. 2017-211937

(51) Int. Cl.
*B41J 2/045* (2006.01)
*B41J 11/00* (2006.01)
*G06K 15/02* (2006.01)
*G06K 15/00* (2006.01)

(52) U.S. Cl.
CPC ......... *B41J 2/04536* (2013.01); *B41J 2/0458* (2013.01); *B41J 2/04528* (2013.01); *B41J 2/04556* (2013.01); *B41J 11/0095* (2013.01); *G06K 15/00* (2013.01); *G06K 15/1809* (2013.01); *B41J 2/04541* (2013.01)

(58) Field of Classification Search
CPC .. B41J 2/04536; B41J 2/04556; B41J 2/0458; B41J 2/04528; B41J 2/04541; G06K 15/00; G06K 15/1809
See application file for complete search history.

(56) References Cited

U.S. PATENT DOCUMENTS 6,969,155 B2 * 11/2005 Umezawa ............ B41J 2/04541
                                                    347/11
9,776,434 B2 * 10/2017 Saikawa .............. B41J 11/0085
9,944,082 B2 *  4/2018 Horade ................ B41J 2/16511

FOREIGN PATENT DOCUMENTS

JP    2005-028607 A    2/2005

\* cited by examiner

*Primary Examiner* — Thinh H Nguyen
(74) *Attorney, Agent, or Firm* — Venable LLP (57) ABSTRACT

A printing apparatus receives, as serial data, a plurality of commands for driving a printhead including arrayed print elements to perform printing. Then, a first signal is internally generated in the apparatus, and a second signal is generated based on the position of a conveyed print medium. In addition, each command is extracted from the received serial data. While switching over the first and second signals based on each command, the printhead is driven to perform a preparation operation prior to image printing by the printhead based on the first signal and to print an image based on image data on the print medium based on the second signal. Upon switchover of the first signal to the second signal, switchover to the second signal is controlled after disabling the first signal for a predetermined period.

18 Claims, 10 Drawing Sheets

PRINTING APPARATUS AND PRINT CONTROL METHOD

BACKGROUND OF THE INVENTION

Field of the Invention

The present invention relates to a printing apparatus and a print control method, and particularly to, for example, a printing apparatus that prints an image by discharging ink to a print medium from a full-line printhead, and a print control method thereof. Furthermore, the present invention relates to a technique of certainly transferring driving data to the full-line printhead even when changing to a printing state from a registration operation state which is performed upon feeding a print medium at the time of printing.

Description of the Related Art

In a conventional inkjet printer, a print method has been generally used in which while reciprocally scanning a carriage mounted with a printhead in an orthogonal direction with respect to the conveyance direction of a sheet-like print medium such as a print sheet, ink is discharged from the printhead, thereby printing an image on the print medium. An advantage of this method is that "multi-pass printing" is performed in which printing is performed by repetitively scanning a single region of a print medium by the carriage, so that a variation in ink dot is averaged and a high-resolution image such as a photo-quality image can be output. However, multi-pass printing is unnecessary for a document with text alone or a business document including a table or graph, and therefore "single pass printing" is generally used in which an image is formed by scanning the carriage once in a forward direction or a backward direction. In this case, the print speed is proportional to the length of the nozzle array of the printhead. That is, a time corresponding to the number of scans of the carriage is required to form an image for one print sheet.

When adopting this arrangement, it is unnecessary to reciprocally scan the carriage mounted with the printhead, and only a print medium need be conveyed alone while fixing the full-line printhead at a predetermined position and discharging ink. Thus, the print speed dramatically improves as compared to a method in which the carriage is scanned.

The control configuration of a printhead is significantly different between a serial type printing apparatus which reciprocally scans a carriage and a printing apparatus mounted with a full-line printhead.

Figure 8:
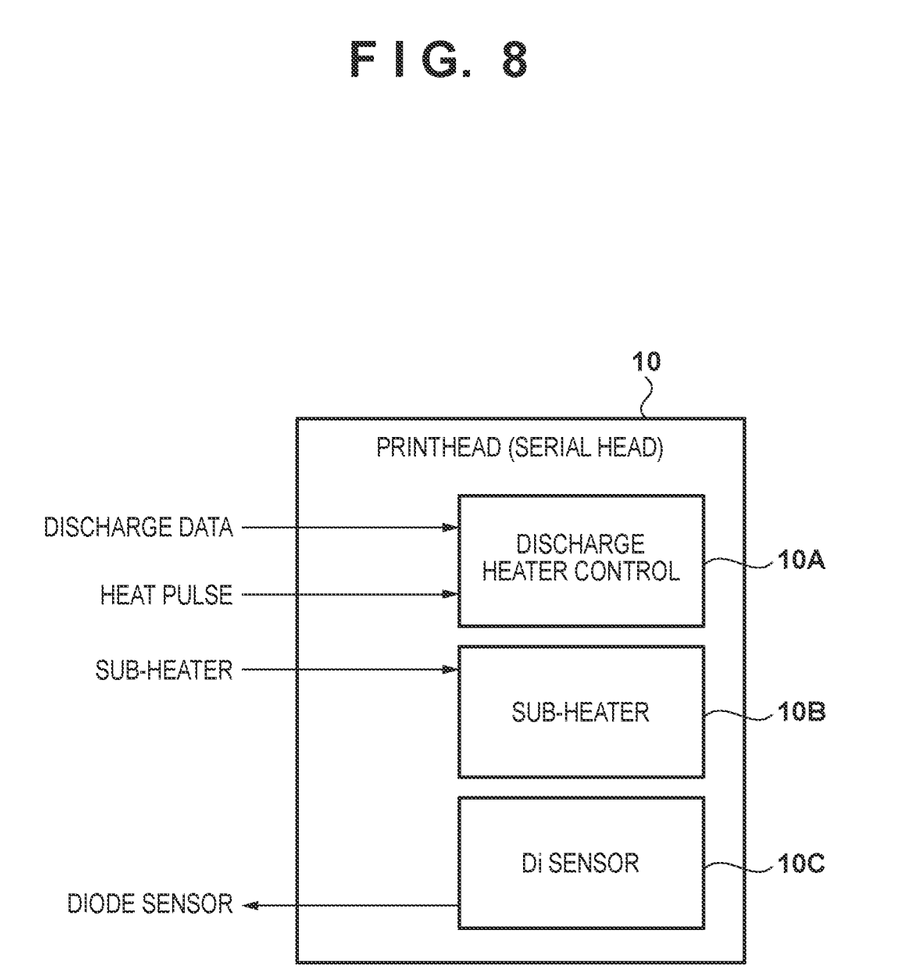
FIG. 8 is a view showing the data transfer configuration of a conventional head arrangement.

FIG. 8 is a view schematically showing the control configuration of a printhead (to be referred to as a serial head hereinafter) which is mounted in a conventional serial type printing apparatus.

As shown in FIG. 8, discharge data, a heat pulse, a sub-heater pulse, and a diode sensor output are respectively assigned to dedicated signal lines. Through the respective signal lines, discharge data and a heat pulse are input to a discharge heater control block 10A, a sub-heater pulse is input to a sub-heater 10B, and a diode sensor signal is output from a Di sensor 10C. In this way, different signals are respectively assigned to dedicated signal lines, and a signal is generally transmitted/received between a serial head 10 and the printing apparatus mounted with the serial head 10.

However, the number of integrated nozzles significantly increases in a full-line printhead, and therefore in a case where the same control configuration as the serial head shown in FIG. 8 is adopted in a full-line printhead, the number of signal lines becomes enormous. Hence, control of a full-line printhead adopts serial data in a command format by using an Application-Specific Integrated Circuit (to be referred to as an ASIC hereinafter).

Figure 9:
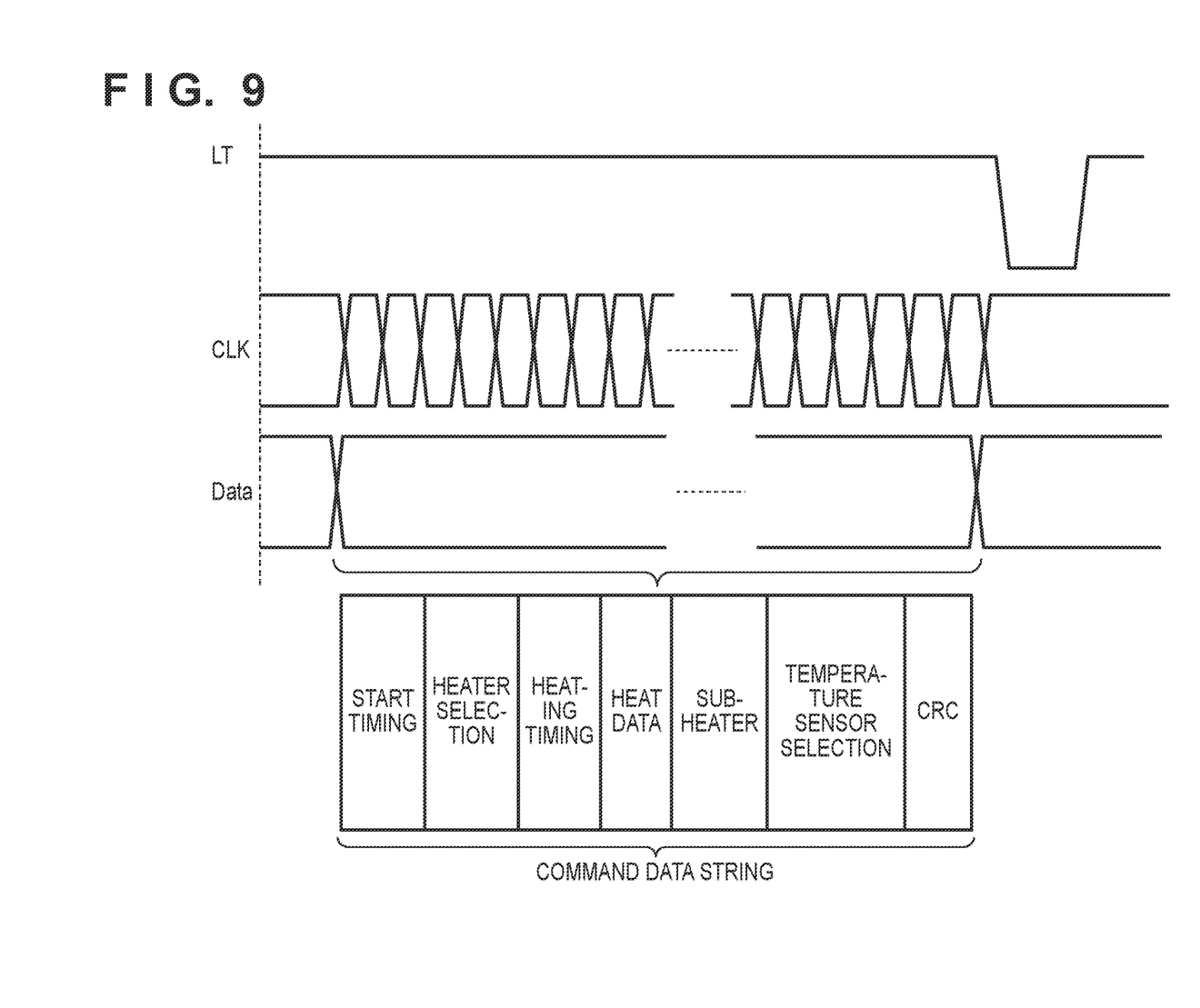
FIG. 9 is a view showing the configuration of serial data which includes command data.

FIG. 9 is a view showing a signal configuration used to control a full-line printhead.

As shown in FIG. 9, a data signal (Data), a clock signal (CLK), and a latch signal (LT) are used as signals and they are transmitted/received via the individual signal lines. In this configuration, a command data string, which includes a plurality of data as commands, is formed and transmitted to the full-line printhead as a data signal (Data) in serial transmission, thereby transferring a large amount of data using lesser signal lines.

FIG. 9 shows an example in which seven different data of CRC, temperature sensor selection, sub-heater, heat data, heating timing, heater selection, and start timing are transmitted as a command data string.

Figure 10:
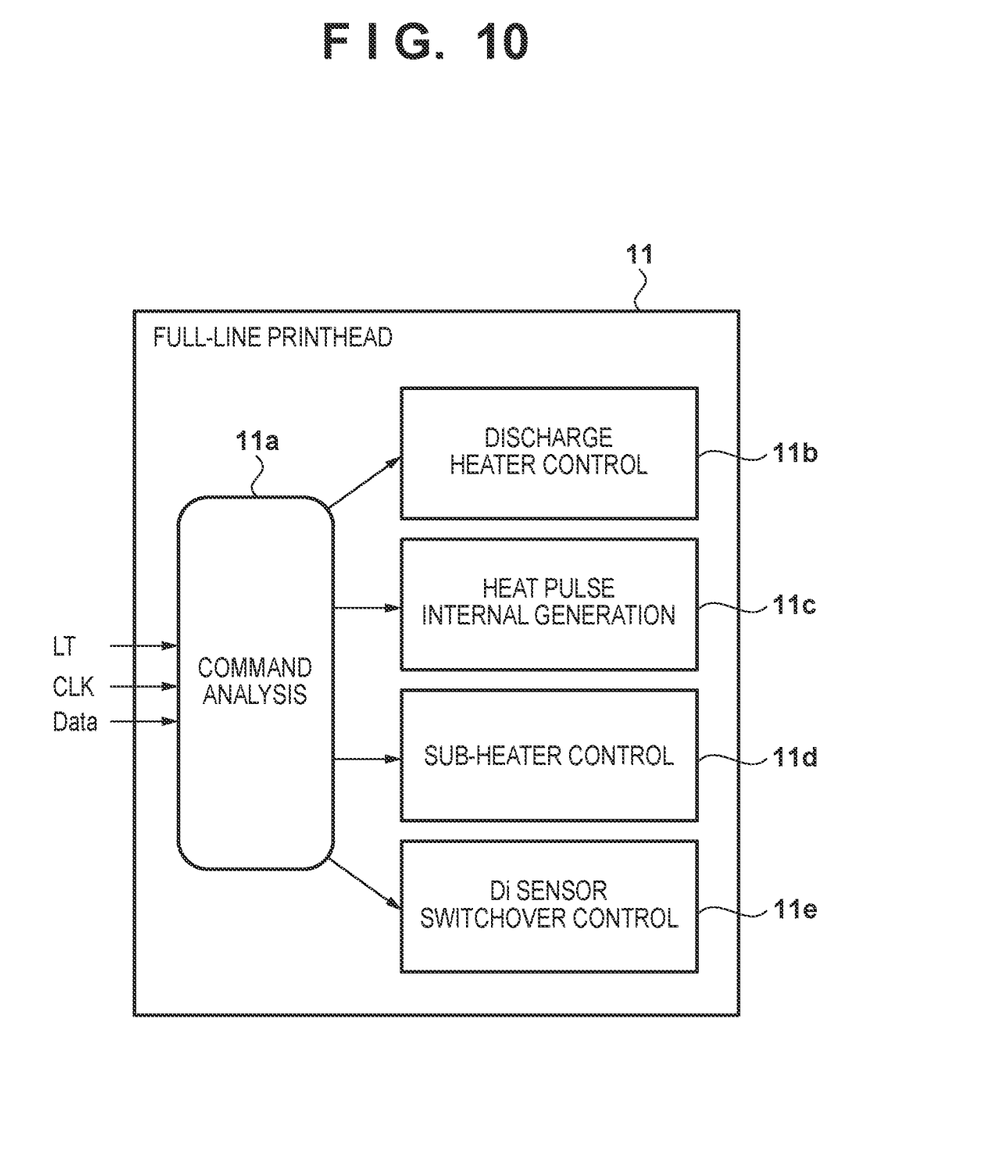
FIG. 10 is a view showing the configuration for controlling a full-line printhead by command serial data.

FIG. 10 is view schematically showing the control configuration of a full-line printhead.

As shown in FIG. 10, serial data including commands transferred as a data signal (Data) undergoes a command analysis in a command analysis block 11a of a receiving-side full-line printhead 11 and is restored to respective data such as discharge data and a discharge pulse. Then, the command analysis block 11a transfers the respective restored data to the corresponding blocks (a discharge heater control block 11b, a heat pulse internal generation block 11c, a sub-heater control block 11d, a Di sensor switchover control block 11e). In this way, it is possible to perform printing while controlling the full-line printhead 11.

However, in a registration operation performed upon feeding a print medium when a printing apparatus using a full-line printhead performs printing, a conveyance roller which feeds and conveys the print medium performs a complicated rotation operation including a forward rotation, a reverse rotation, and a stop. Thus, latch trigger periods generated based on encoder signals output from an encoder (LF encoder), which detects the motion of the conveyance roller, become uncertain. A latch trigger signal is a timing signal for transferring image data to the internal logic circuit of the full-line printhead and driving a print element. Hence, when the latch trigger periods become uncertain due to the forward rotation/reverse rotation/stop of the conveyance roller, the full-line printhead needs to be continuously driven by switching over to a latch trigger signal which is internally generated in the ASIC.

Japanese Patent Laid-Open No. 2005-028607 discloses that a printing apparatus mounted with a serial head, in which an encoder is mounted on a carriage, a latch trigger signal is generated based on an encoder signal, and a print operation is performed based on the latch trigger signal, has features as described below.

The printing apparatus includes a detection unit for detecting an abnormality in an encoder signal, and a trigger signal generation unit for generating a latch trigger signal which has the same period as a latch trigger signal generated from an encoder signal. When an abnormality in an encoder signal is detected, a latch trigger signal generated from the encoder signal is switched over to a latch trigger signal generated by the trigger signal generation unit, and the print operation is continued. Thus, print can be continued even when an abnormality occurs in an encoder signal. Japanese Patent Laid-Open No. 2005-028607 also discloses an arrangement for informing a user of an abnormality in an encoder sensor signal.

As described above, Japanese Patent Laid-Open No. 2005-028607 discloses an arrangement in which a means for switching over two latch trigger signals is provided, and when an abnormality occurs in an encoder signal, the printhead is driven while switching over to the latch trigger signal whose timing is generated in the internal circuit of the printing apparatus, thereby enabling a continuation print.

However, in the arrangement disclosed in Japanese Patent Laid-Open No. 2005-028607, since the timing of switchover of two latch trigger signals is not considered, the following problem may occur.

For example, in a case where a method of transferring command serial data for controlling the drive of a full-line printhead as described above is adopted, a time for transferring commands must be reserved. If the transfer of serial data is interrupted, it results in loss of commands. For example, command serial data includes a command for controlling the temperature of the full-line printhead. If the transfer of the serial data is interrupted and the command gets lost, the interval between the temperature control operations becomes too long. This may lead to, for example, a drop of ink temperature, an increase of ink viscosity, and a discharge failure. As a result, the reliability of the full-line printhead cannot be maintained.

In summary, upon switchover of a latch trigger (to be referred to as an internal latch trigger hereinafter) generated in the internal circuit of the printing apparatus to a latch trigger (to be referred to as an external latch trigger hereinafter) generated based on an encoder signal, if a transfer of serial data is interrupted, a command gets lost. In this case, the control based on the lost command will not be executed.

Figure 11:
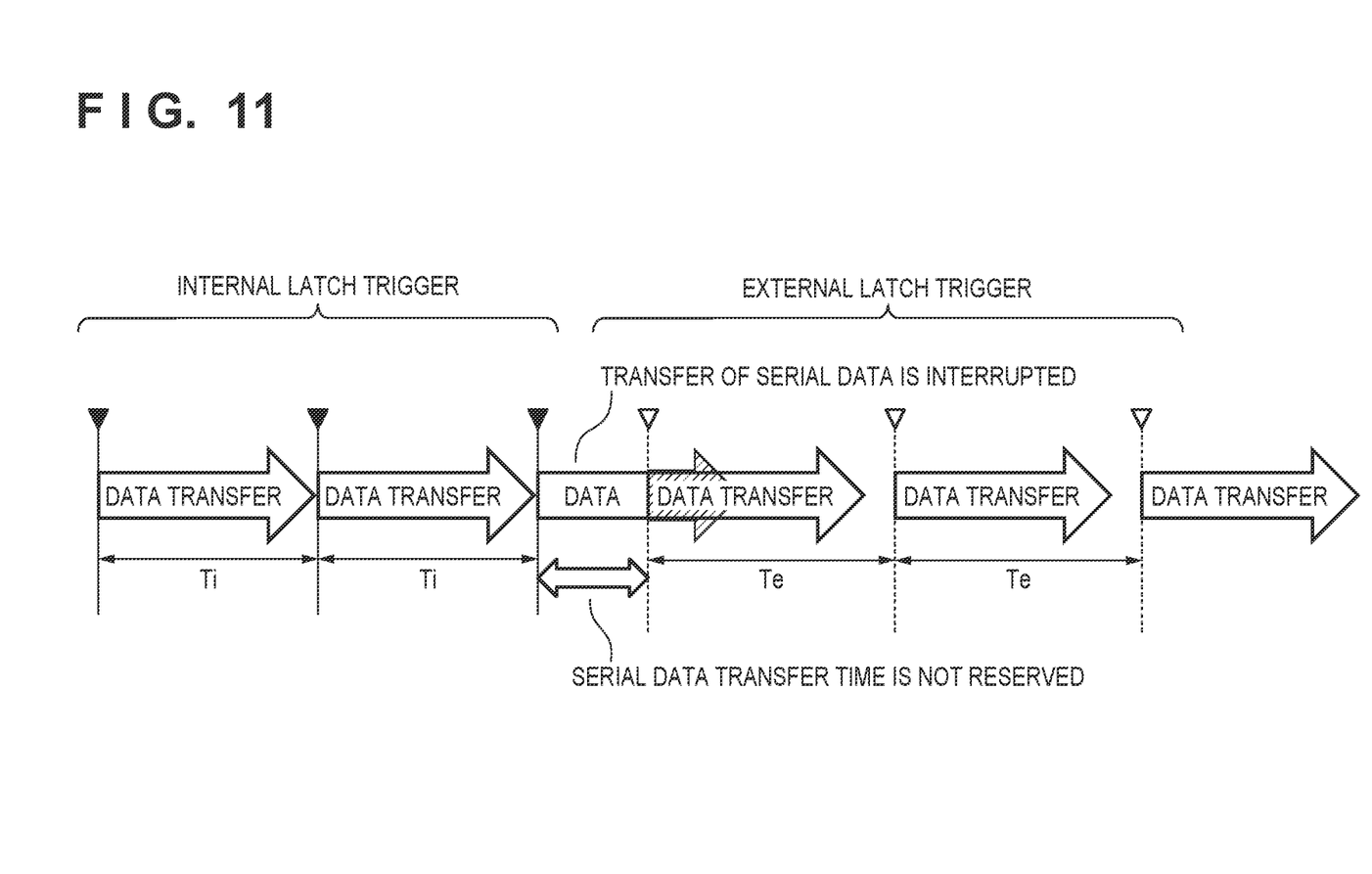
FIG. 11 is a view showing a case where a latch trigger is switched over at an early timing.

FIG. 11 is a view showing a relationship between the timing of switchover of an internal latch trigger to an external latch trigger and data transfer.

As shown in FIG. 11, when switchover to the external latch trigger is performed without reserving a time (Ti) for transferring the serial data by the internal latch trigger, the preceding serial data transfer is interrupted. In this case, the command included in the serial data in transfer gets lost.

SUMMARY OF THE INVENTION

Accordingly, the present invention is conceived as a response to the above-described disadvantages of the conventional art.

For example, a printing apparatus and a print control method according to this invention are capable of performing printing by controlling the drive of a printhead while switching over two signals at an appropriate timing.

According to one aspect of the present invention, there is provided a printing apparatus that prints an image, by a printhead including arrayed print elements, on a print medium conveyed in a direction intersecting an arrayed direction of the print elements, comprising: a reception unit configured to receive, as serial data, a plurality of commands for driving the printhead to perform printing; a first generation unit configured to internally generate a first signal in the printing apparatus; a second generation unit configured to generate a second signal based on information indicating a position of the conveyed print medium; an extraction unit configured to extract each of the plurality of commands from the serial data received by the reception unit; a drive unit configured to drive the printhead to perform a preparation operation prior to image printing by the printhead based on the first signal and to print an image based on image data on the print medium based on the second signal, while switching over the first signal and the second signal based on the each of the plurality of commands extracted by the extraction unit; and a control unit configured to control switchover to the second signal after disabling the first signal for a predetermined period upon switchover of the first signal to the second signal.

According to another aspect of the present invention, there is provided a print control method of a printing apparatus that prints an image, by a printhead including arrayed print elements, on a print medium conveyed in a direction intersecting an arrayed direction of the print elements, comprising: receiving, as serial data, a plurality of commands for driving the printhead to perform printing; internally generating a first signal in the printing apparatus; generating a second signal based on information indicating a position of the conveyed print medium; extracting each of the plurality of commands from the received serial data; driving the printhead to perform a preparation operation prior to image printing by the printhead based on the first signal and to print an image based on image data on the print medium based on the second signal, while switching over the first signal and the second signal based on the each of the extracted plurality of commands; and controlling switchover to the second signal after disabling the first signal for a predetermined period upon switchover of the first signal to the second signal.

The invention is particularly advantageous since it is capable of performing printing by controlling the drive of the printhead while switching over two signals at an appropriate timing. For example, switchover of a latch trigger signal occurs upon changing to a print operation from a registration operation performed when feeding a print medium. By reserving a data transfer time for the printhead upon the switchover, a control for maintaining the reliability of the printhead can be seamlessly continued.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings. Note that in the following description, the same reference numerals denote the same components throughout the drawings. Accordingly, each component which is already described is denoted by the same reference numeral as before, and a repetitive description thereof will not be given.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Furthermore, a "print element" generically means an element for generating energy used to apply a printing agent to a print medium. In the following embodiment, an electrothermal transducer is used as the element.

<Printing Apparatus Mounted with Full-Line Printhead (FIG. 1)>

Figure 1:
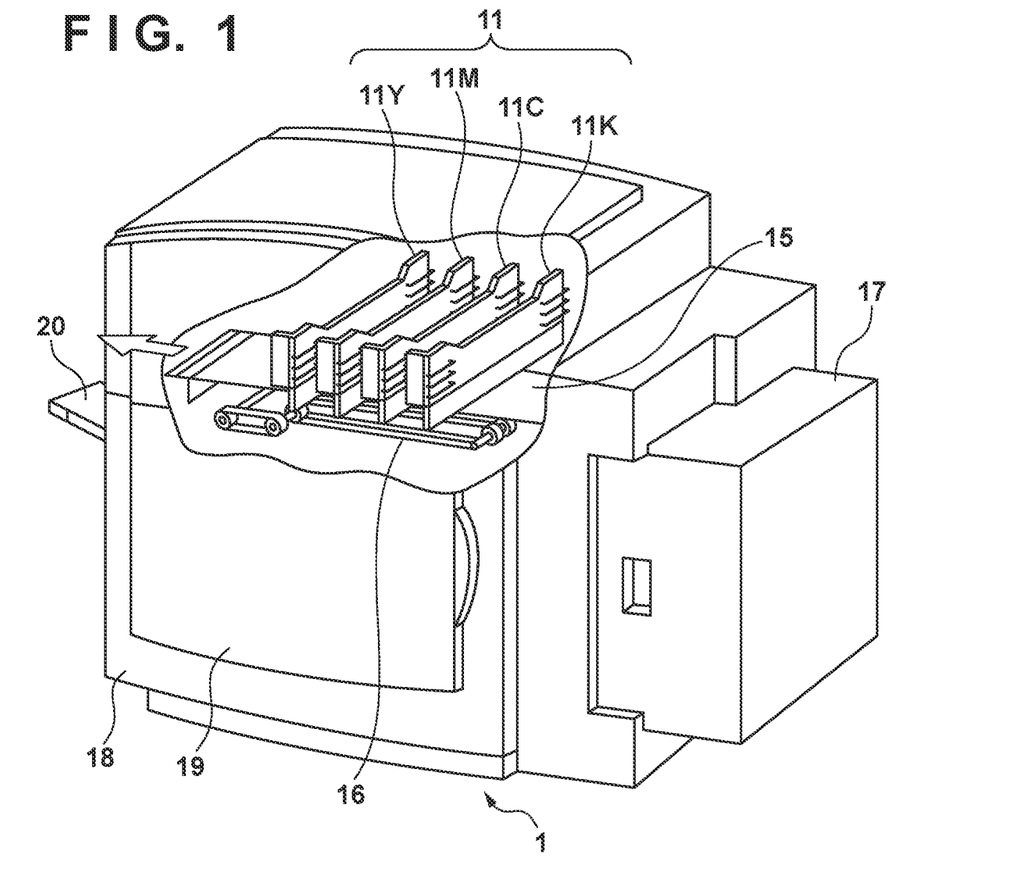
FIG. 1 is a perspective view showing the schematic structure of a printing apparatus which performs printing by discharging ink from a full-line printhead complying with the inkjet method according to an exemplary embodiment of the present invention.

FIG. 1 a perspective view for explaining the structure of a printing apparatus according to an exemplary embodiment of the present invention. As shown in FIG. 1, a printing apparatus 1 includes full-line printheads (to be referred to as printheads hereinafter) 11K, 11C, 11M, and 11Y complying with the inkjet method. Note that when the four printheads 11K, 11C, 11M, and 11Y are collectively referred to in the following description, they are referred to as a printhead 11.

In the printing apparatus 1, a print medium 15 is supplied from a feeder unit 17 to a print position by the printhead and conveyed to a direction represented by an arrow in FIG. 1 by a conveyance unit 16 included in a housing 18 of the printing apparatus.

Printing an image on the print medium 15 is performed by the printhead fixed at a predetermined position while conveying the print medium 15. When the reference position of the print medium 15 reaches a position under the printhead 11K that discharges black (K) ink, the printhead 11K discharges the black ink. Similarly, when the print medium 15 reaches respective reference positions in the order of the printhead 11C that discharges cyan (C) ink, the printhead 11M that discharges magenta (M) ink, and the printhead 11Y that discharges yellow (Y) ink, the inks of the respective colors are discharged to form a color image. In each of the printheads for the respective colors, nozzles for discharging ink and electrothermal transducers corresponding to the nozzles are arranged in a direction intersecting the conveyance direction of the printing medium. The print medium 15 on which the image is thus printed is discharged and stacked on a stacker tray 20.

The printing apparatus 1 further includes the conveyance unit 16, and ink cartridges (not shown) configured to supply the inks to the printheads 11K, 11C, 11M, and 11Y and replaceable for each ink. In addition, the printing apparatus 1 includes, for example, a pump unit (not shown) for a recovery operation and ink supply to the printheads 11K, 11C, 11M, and 11Y, and a control board (not shown) that controls the overall printing apparatus 1. A front door 19 is an opening/closing door for replacing the ink cartridge.

Figure 2:
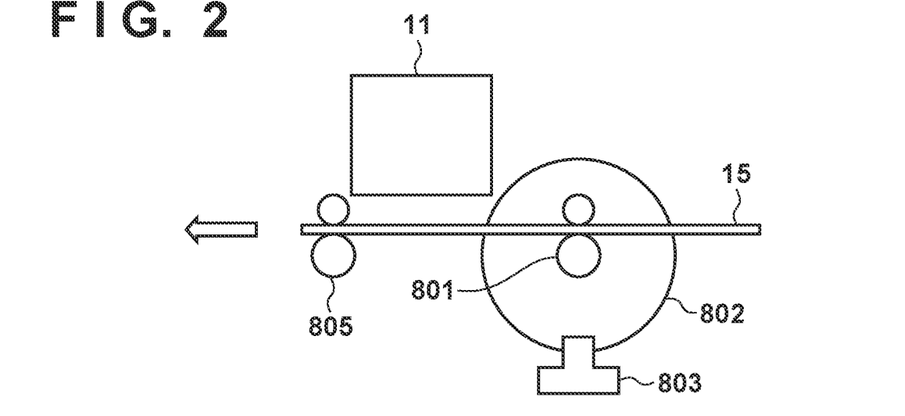
FIG. 2 is a side sectional view showing a relationship between the full-line printhead and a conveyance mechanism in the printing apparatus shown in FIG. 1.

FIG. 2 is a view showing a relationship between the full-line printhead and a print medium conveyance mechanism in the printing apparatus shown in FIG. 1.

As shown in FIG. 2, a conveyance roller 801 for conveying the print medium 15 and a rotary scaler 802 are coaxially attached, and an LF encoder 803 reads the slits provided at regular intervals in the peripheral portion of the rotary scaler 802, thereby calculating position information and speed information of the conveyance roller 801. The ink discharge surface of the printhead 11 is arranged to oppose the print medium. A feed roller 805 discharges the print medium 15, on which an image has been printed by the printhead 11, from a discharge port (not shown) to the stacker tray 20.

<Control Configuration of Printing Apparatus (FIGS. 3 and 4)>

Figure 3:
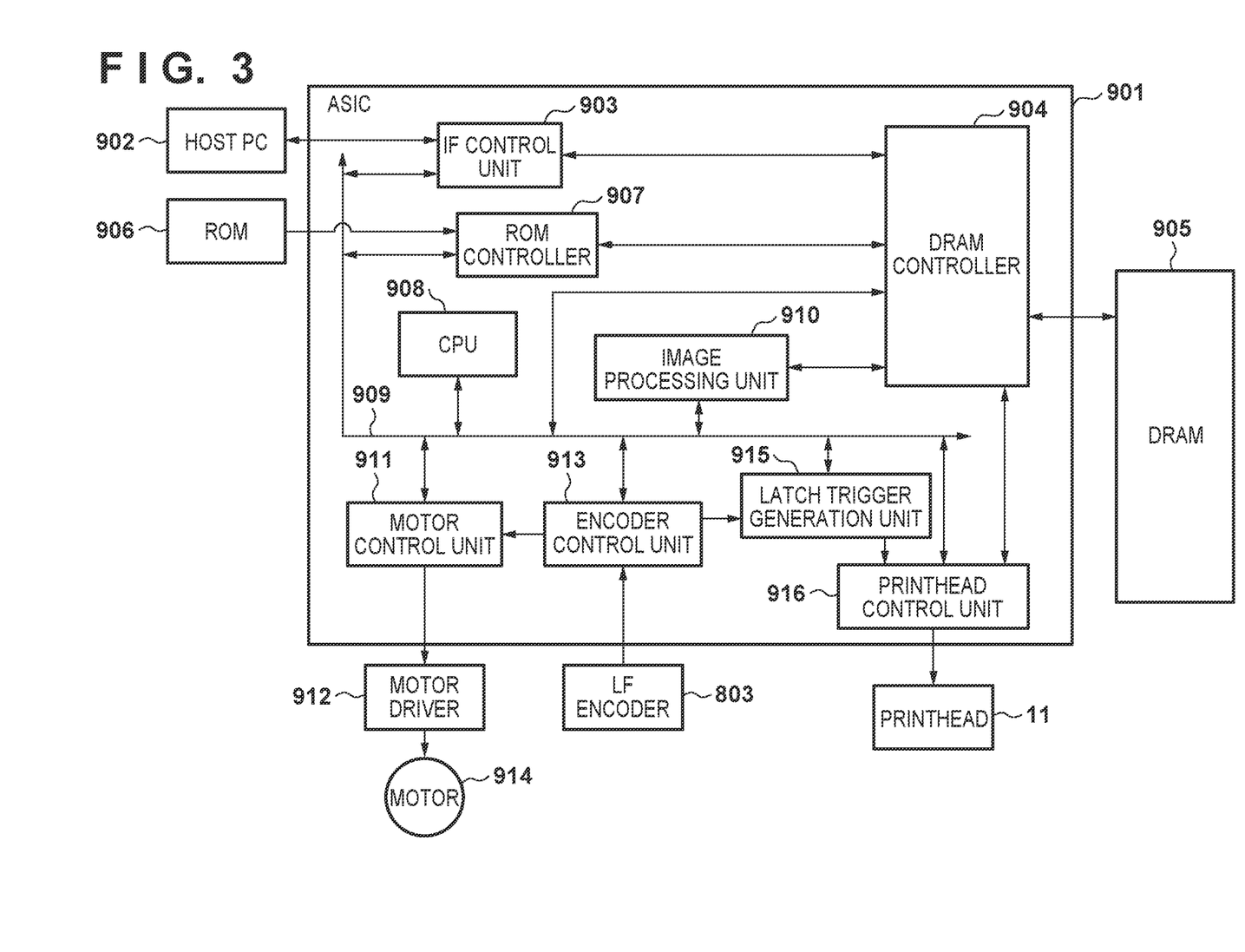
FIG. 3 is a block diagram showing the control configuration of the printing apparatus shown in FIGS. 1 and 2.

FIG. 3 is a block diagram showing the control configuration of the printing apparatus shown in FIGS. 1 and 2.

In FIG. 3, an ASIC 901 is an integrated circuit which performs high-speed processing by implementing functions such as the specific image processing, control of the printhead, and communication interface of the printing apparatus by hardware. A host PC 902 is a general personal computer, which rasterizes and transfers image data to the printing apparatus by using an interface such as USB or Ethernet®. The interface (IF) control unit 903 includes an external interface unit conforming to a standard such as USB or Ethernet®, and has a function of writing image data into a DRAM 905 through a DRAM controller 904 via the interface unit.

The DRAM controller 904 has a bus arbitration function and a direct memory access (DMA) function, and performs exclusive control processing and accesses the DRAM 905 in response to a writing/reading request from each block. The DRAM 905 is an external memory for which a DDR SDRAM is generally used because a high-speed access is regarded to be important. A ROM 906 storing firmware is controlled by a ROM controller 907. Upon activation of the printing apparatus 1, the firmware is read out from the ROM 906 and expanded in the DRAM 905, and a CPU 908 performs, for example, execution processing, interrupt processing, or register setting of each block of the firmware.

As shown in FIG. 3, the CPU 908 is generally integrated in the ASIC 901, but it may be provided as a single component. Each block is connected to the CPU 908 via a bus 909. The bus 909 includes an address bus and a data bus, and sets various registers in each block.

An image processing unit 910 performs processing such as arrangement conversion of image data in accordance with the color conversion of the image data rasterized in the DRAM 905 or the nozzle arrangement of the printhead 11. A motor control unit 911 controls a motor driver 912 to control the drive of a motor 914 serving as a driving source for driving the conveyance roller 801. An encoder control unit 913 calculates and holds speed information and position information from an encoder signal (LF_ENC) output from the LF encoder 803, and the CPU 908 carries out an operation based on the speed information and position information, and enables the motor control unit 911 to perform control such as an acceleration, deceleration, or stop.

This control is a feedback control using PID control, which controls an input value by using three components including the deviation between an output value and a target value, and its derivative and integral.

A latch trigger generation unit 915 is a block which generates a latch trigger, and the specific configuration thereof will be described with reference to FIG. 4. A printhead control unit 916 reads out the image data rasterized in the DRAM 905 to convert it into a command data format as described with reference to FIG. 9, and transfers the data to the printhead 11 in accordance with a latch trigger output from the latch trigger generation unit 915.

Figure 4:
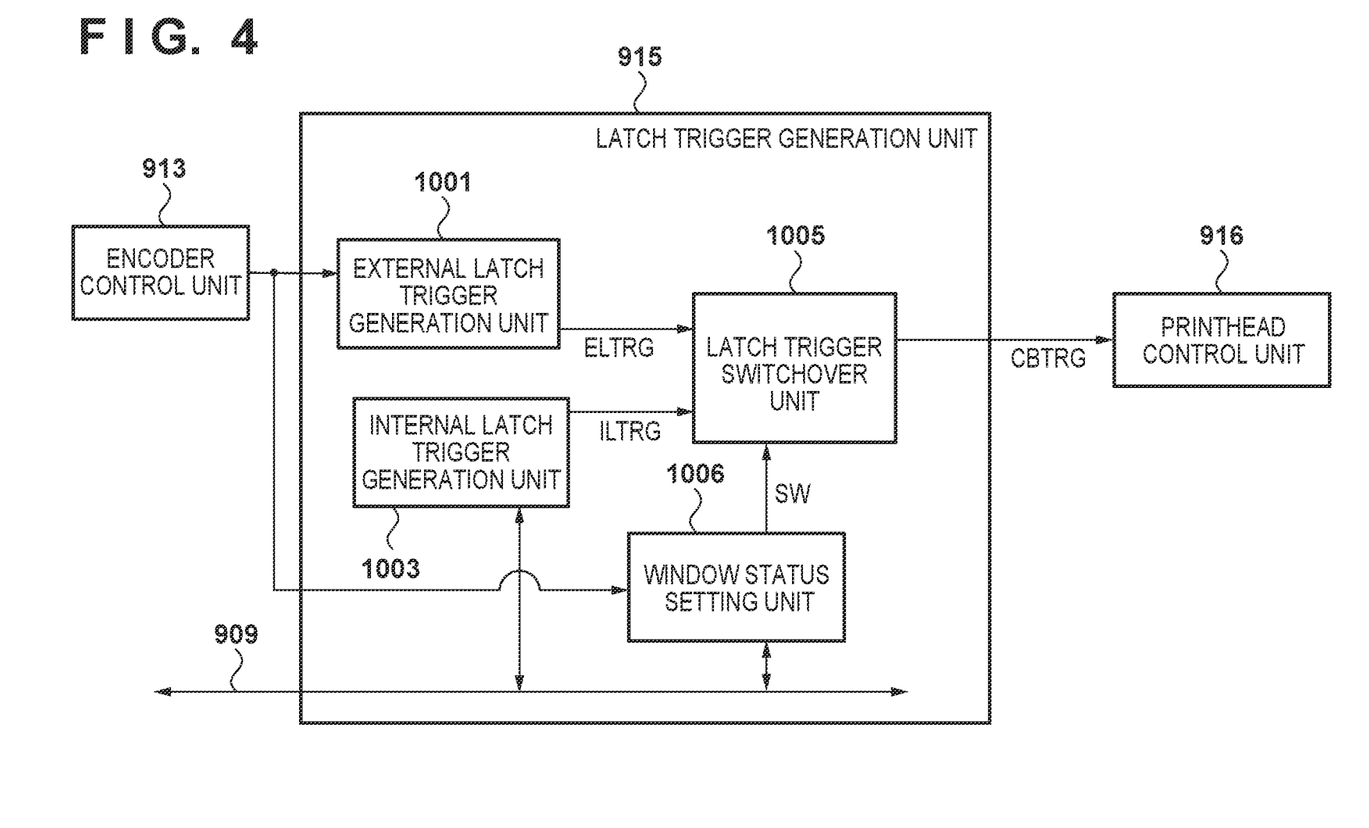
FIG. 4 is a block diagram showing the arrangement of a latch trigger switchover unit.

FIG. 4 is a block diagram showing the detailed internal arrangement of the latch trigger generation unit shown in FIG. 3.

In FIG. 4, an external latch trigger generation unit 1001 generates an external latch trigger (ELTRG) by performing multiplication from the position information output from the encoder control unit 913 to the print resolution. An internal latch trigger generation unit 1003 includes a hardware timer and generates an internal latch trigger (ILTRG) based on a predetermined period. The period of the internal latch trigger (ILTRG) is set by the CPU 908. A latch trigger switchover unit 1005 selects either the external latch trigger (ELTRG) or the internal latch trigger (ILTRG).

A window status setting unit 1006 sets a switchover position of these two latch triggers, compares the information on the switchover position with the position information from the encoder control unit 913, and outputs a switchover signal (SW) to the latch trigger switchover unit 1005. The latch trigger switchover unit 1005 outputs a combined latch trigger (CBTRG) which indicates an output status after the selection of the switchover of the two latch trigger signals.

As described in the section "Description of the Related Art", upon a registration operation performed when feeding a print medium, the conveyance roller 801 adjusts the position of the print medium by performing a drive including a forward rotation, reverse rotation, and stop, and therefore the periods of the external latch triggers (ELTRG) become uncertain. Accordingly, switchover to the internal latch trigger (ILTRG) is required.

Figure 5:
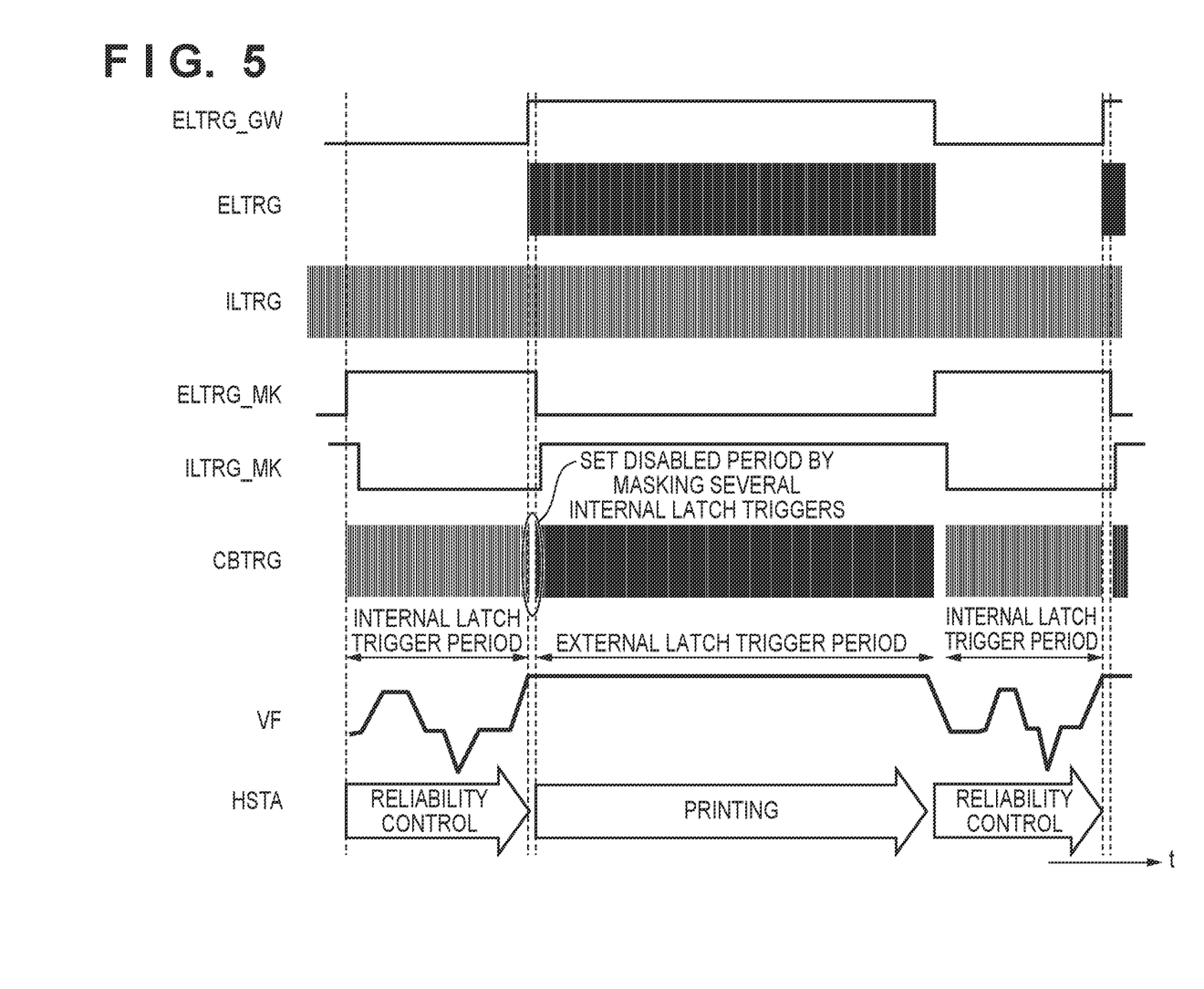
FIG. 5 is a timing chart showing a latch trigger switchover method.

FIG. 5 is a timing chart showing control in which switchover of the external latch trigger and the internal latch trigger is performed by window settings. Note that time starts from the left side and proceeds to the right side in FIG. 5.

In FIG. 5, vertical stripes representing the external latch triggers (ELTRG) schematically represent a trigger signal, and do not represent the trigger intervals. The external latch trigger (ELTRG) is in an enabled status when the level of an external latch trigger generation window (ELTRG_GW), which is a signal representing the window of the external latch trigger (ELTRG), is high, and is in a disabled status when that level is low.

The external latch trigger generation window (ELTRG_GW) sets a generation period of the external latch trigger (ELTRG) with respect to the external latch trigger generation unit 1001. The position information for specifying a point of enabling/disabling the window is position information output from the encoder control unit 913. The external latch trigger (ELTRG) is a latch trigger used during printing. Accordingly, the window is enabled before the start of printing in order to start the generation of a trigger. The generation of the external latch trigger (ELTRG) is stopped by disabling the window after the completion of printing. The external latch trigger (ELTRG) is not generated in periods other than a printing period because the periods of encoder signals (LF_ENC) become uncertain due to the operation of the conveyance roller 801 including a forward rotation, reverse rotation, and stop upon a registration operation of a print medium or the like, so they cannot be used as latch triggers.

An internal latch trigger (ILTRG) is an internal signal generated in the internal latch trigger generation unit 1003. The timing period thereof is implemented by a hardware timer. The period of the internal latch trigger (ILTRG) is shorter than a maximum period for performing a process for maintaining the reliability of the printhead, and is longer than a data transfer time. This enables reserving the reliability even when the printhead is driven in accordance with the period of the internal latch trigger (ILTRG) for a registration operation or the like.

An external latch trigger mask window (ELTRG_MK) is a window for setting the output selection of the external latch trigger (ELTRG). When the level of a signal representing the window is high, the external latch trigger (ELTRG) is masked. On the other hand, when the level of the signal is low, the external latch trigger (ELTRG) is not masked, and the external latch trigger signal is selected and output.

As shown in FIG. 5, during printing, the level of the external latch trigger mask window (ELTRG_MK) is low, and therefore the external latch trigger (ELTRG) is not masked but selected. An internal latch trigger mask window (ILTRG_MK) sets a window for the internal latch trigger (ILTRG) and masks it. A combined latch trigger (CBTRG) represents the status of the latch trigger after the selection of the switchover of the above-described two latch triggers. This is a latch trigger signal which is output from the latch trigger switchover unit 1005 shown in FIG. 4.

A method of switching over the internal latch trigger (ILTRG) to the external latch trigger (ELTRG) while matching the timing by the settings of the above-described two windows will be described.

As described above, in a case where the internal latch trigger (ILTRG) is immediately switched over to the external latch trigger (ELTRG), as indicated with reference to FIG. 11, transfer of serial data is interrupted, resulting in failure of the execution of a command. In order to solve this problem, in this embodiment, upon switchover of the internal latch trigger (ILTRG) to the external latch trigger (ELTRG), the window is set so as to mask a predetermined number of the internal latch triggers (ILTRG). When performing such masking, a combined latch trigger (CBTRG), that includes a disabled period of the internal latch trigger (ILTRG) generated by the masking, is generated upon switchover of the internal latch trigger (ILTRG) to the external latch trigger (ELTRG).

However, when the disabled period generated by the masking lasts so long that the interval between the latch triggers becomes excessively long, even though transfer of serial data to the printhead can be executed, its data transfer interval extends. Hence, data transfer should be executed at a period required to perform a process for maintaining the reliability of the printhead as a preparation operation prior to image printing.

Note that as described in the section "Description of the Related Art", a conventional printing apparatus generally performs switchover using firmware by the CPU. However, in this case, change of the execution sequence or a delay time due to task processing by the real-time OS is uncertain.

To the contrary, this embodiment implements switchover of a latch trigger using a window by a hardware circuit in the ASIC. This enables seamless switchover of two latch triggers by performing masking or unmasking immediately after a print medium has reached a predetermined position, without intervening the firmware.

A printing apparatus that is mounted with a full-line printhead also needs to continue processing for maintaining the reliability of the printhead when changing from feeding of a print medium to start of printing. In addition, since data to be transferred to the full-line printhead is serial data which includes a plurality of data as commands, a transfer interruption and delay of command data upon switchover of two latch triggers are unacceptable as described above. Furthermore, since an interval between latch triggers is about 100 μsec, in order to seamlessly change an internal latch trigger (ILTRG) to an external latch trigger (ELTRG), an arrangement in which switchover is performed by hardware is required. With this arrangement, it is possible to adjust a switchover timing even by about 100 μsec, which corresponds to the period of a latch trigger, without intervening the firmware by the CPU. Particularly, this is the most appropriate arrangement for a full-line printhead for which very high-accuracy reliability control is demanded.

Note that in this embodiment, a blank period is also provided upon switchover of the external latch trigger (ELTRG) to the internal latch trigger (ILTRG) after completion of printing, so that the two latch triggers do not overlap with each other. This blank period is not set by the count of the internal latch trigger (ILTRG), but is generated by a counter using the system clock of the ASIC of the printing apparatus.

The reason for performing this control is as follows. That is, there is an assumption that when starting a printing, in order to reserve a time for performing reliability control such as temperature adjustment of the printhead 11, switchover of the internal latch trigger (ILTRG) to the external latch trigger (ELTRG) should be performed as seamlessly as possible. On the other hand, when starting printing the next page after completion of the printing of one page, a time for feeding a print medium is required. Accordingly, there is a temporal margin to perform the temperature adjustment again. Hence, when switching over the external latch trigger (ELTRG) to the internal latch trigger (ILTRG), the switchover is controlled by a timer setting by the system clock whose circuit arrangement is simple.

As described above, upon switchover of the internal latch trigger (ILTRG) to the external latch trigger (ELTRG), a predetermined number of the internal latch triggers (ILTRG) are masked. This enables the seamless continuation of control for maintaining the reliability of the printhead while reserving a time for transferring serial data to the printhead, as indicated by the status of the combined latch trigger (CBTRG) even upon switchover of the two latch triggers.

Speed of conveyance roller (VF) represents the speed state (acceleration, constant, deceleration, and stop) of the conveyance roller, and state of the printhead 11 (HSTA) represents a "reliability control" state and a "printing" state.

Reliability control of the printhead such as a sub-heater heating/pre-discharge operation needs to be started prior to start of printing and continued during printing and even during a feed of a print medium between printings of respective pages. This is because if the reliability control stops, the quality of a printed image may degrade during the printing or at the start of the next printing. However, as indicated by the state of the speed of conveyance roller (VF), the conveyance roller 801 rotates at a constant speed during printing. On the other hand, during a registration operation of a print medium, the conveyance roller 801 rotates while repetitively changing among a forward rotation, reverse rotation, and stop. Hence, as described above, the periods of the encoder signals LF_ENC become uncertain, and there is a time in which the periods cannot be reserved by using the external latch trigger (ELTRG) alone.

Figure 6:
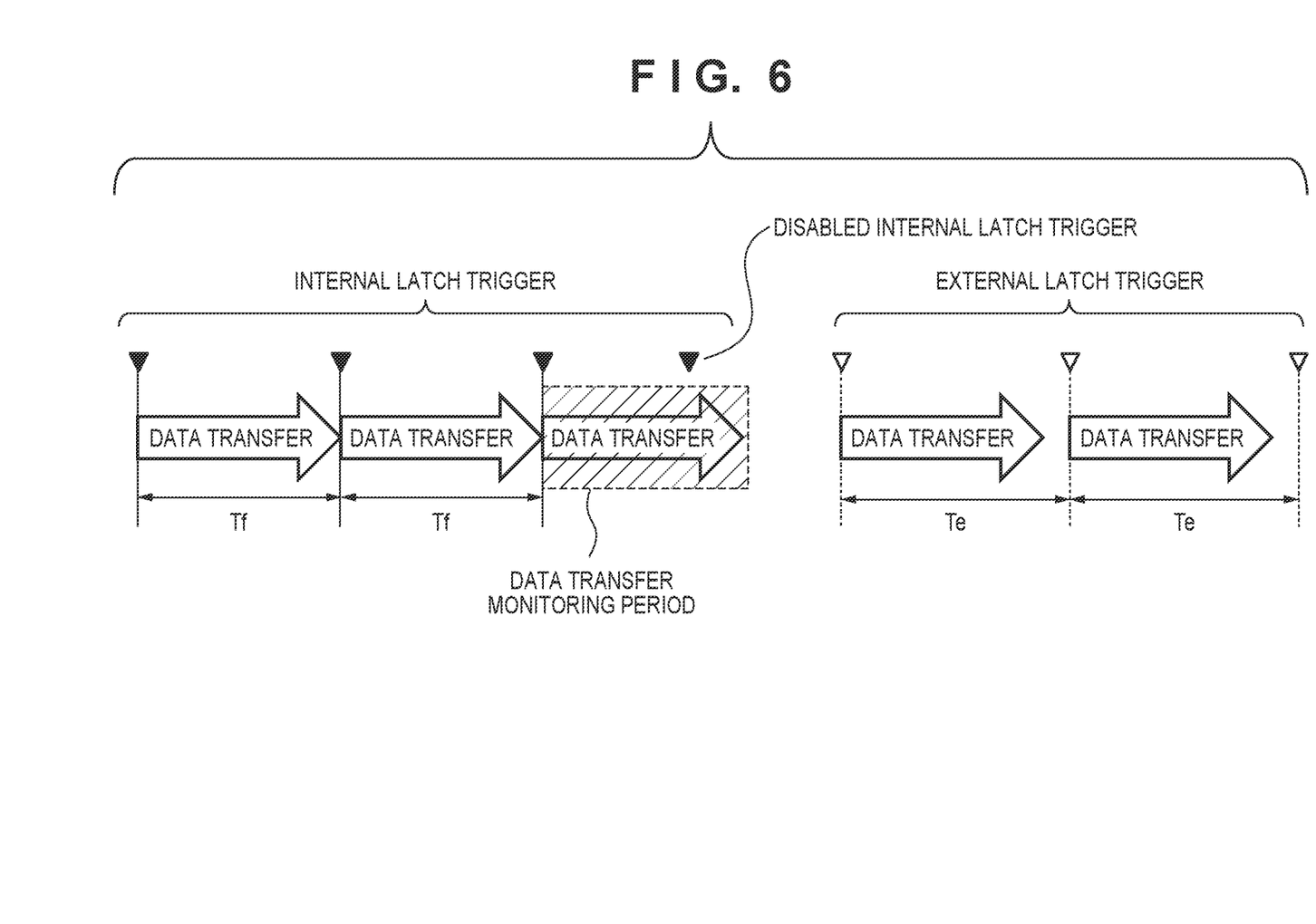
FIG. 6 is a view showing a timing of switchover of two latch triggers.

FIG. 6 is a view showing a timing of switchover of an internal latch trigger to an external latch trigger.

FIG. 6 illustrates that upon switchover of the internal latch trigger (ILTRG) to the external latch trigger (ELTRG), a predetermined number of the internal latch triggers (ILTRG) are masked so that a disabled period is provided, as described above.

In addition, as can be seen from FIG. 6, in this embodiment, it may be monitored whether the serial data transfer based on the last internal latch trigger (ILTRG) which occurs upon the switchover is in process. When it is determined by the monitoring that the serial data is in transfer, completion of the serial data transfer is given priority and the external latch trigger (ELTRG) is temporarily masked. With this monitor function, serial data transfer upon switchover of a latch trigger can be monitored, so that the transfer time for the serial data can be reserved. In this embodiment, upon switchover of the internal latch trigger (ILTRG) to the external latch trigger (ELTRG), only a predetermined number of the internal latch triggers (ILTRG) are masked. Hence, unless the variation in speed of the conveyance roller 801 becomes extraordinarily large, this monitor function will not be used.

Figure 7:
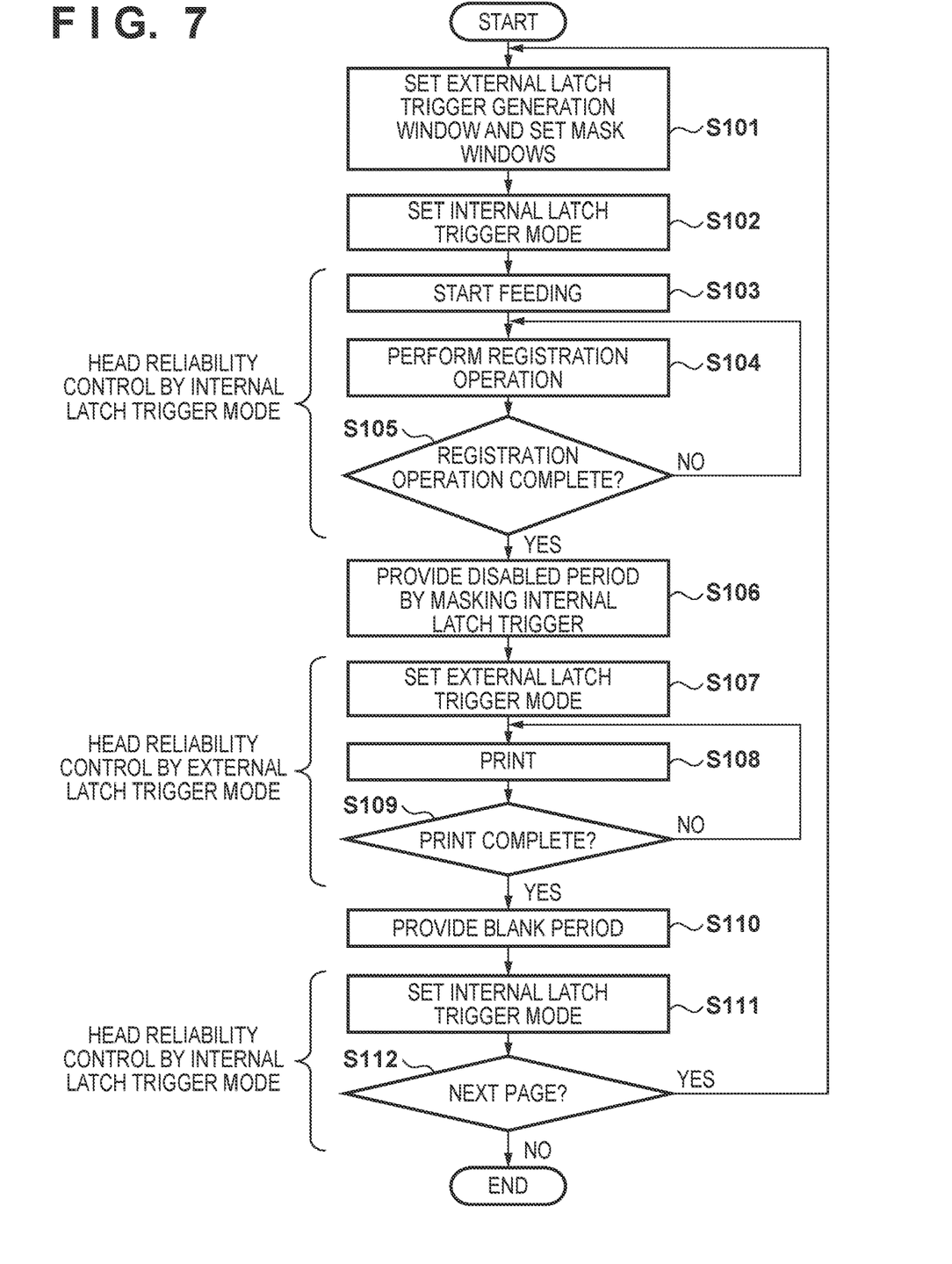
FIG. 7 is a flowchart showing a print control process involving switchover of a latch trigger.

FIG. 7 is a flowchart showing a print control process involving switchover of a latch trigger. The process described below is started after the printing apparatus mounted with the full-line printhead receives a print start instruction.

In step S101, an external latch trigger generation window (ELTRG_GW), an external latch trigger mask window (ELTRG_MK), and an internal latch trigger mask window (ILTRG_MK) are set. More specifically, this is performed by setting position information representing the enabled/disabled position of the window in the window setting register of the window status setting unit 1006.

In response to the reception of the print start instruction, an internal latch trigger (ILTRG) is output to a combined latch trigger (CBTRG) based on the setting information of the internal latch trigger mask window (ILTRG_MK) in step S102. The feeding operation of a print medium is started in step S103, and the drive control, such as a forward rotation, reverse rotation, and stop, of the conveyance roller is performed to start a registration operation in step S104.

In step S105, it is checked whether the registration operation is complete. When it is determined that the registration operation is not complete, the process returns to step S104. Otherwise, the process proceeds to step S106. Note that during the registration operation prior to printing in steps S103 and S104, in order to perform the reliability control of the printhead 11 such as a sub-heater heating/pre-discharge operation as described above, the internal latch trigger (ILTRG) is selected as the combined latch trigger (CBTRG).

In step S106, a predetermined number of the internal latch triggers (ILTRG) are masked so that a disabled period is provided.

In step S107, an external latch trigger (ELTRG) is output to the combined latch trigger (CBTRG) based on the setting information of the external latch trigger generation window (ELTRG_GW) (external latch trigger mode). In step S108, the printhead 11 is driven based on image data to perform printing. In step S109, it is checked whether the printing is complete. When it is determined that the printing is not complete, the process returns to step S108, and the print operation continues. When it is determined that the printing is complete, the process advances to step S110.

In step S110, a blank period is generated by a counter using the system clock of the printing apparatus, and after the blank period, switchover to the internal latch trigger (ILTRG) is performed (internal latch trigger mode) in step S111. In step S112, it is checked whether to print the next page. When it is determined to print the next page, the process returns to step S101, and the setting of the respective windows is performed to continue printing. When it is determined not to print the next page, the process ends.

The above-described control is summarized as follows.

During the registration operation performed upon feeding a print medium at the time of printing, the internal latch trigger is used because the external latch triggers to be generated from the LF encoder are uncertain so the periods cannot be reserved. Upon completion of the registration operation, the apparatus changes to the print operation. Along with the change of the operation, the internal latch trigger is switched over to the external latch trigger. Upon the switchover, a predetermined number of the internal latch triggers are masked so that a disabled period is provided to reserve a data transfer time for the printhead. In addition, a data transfer time is also reserved when switching over the two latch triggers based on the determination as to whether data transfer is in process.

The period of the internal latch trigger is shorter than a maximum period required to continue the reliability control of the printhead, and is longer than the data transfer time. This is for maintaining the reliability of the printhead even when the printhead is driven in accordance with the period of the internal latch trigger for a registration operation or the like. This is also for reserving a temporal margin for a data transfer time.

According to the embodiment described above, a time to transfer driving data of the printhead can be reserved upon switchover of a latch trigger which occurs when changing a registration operation to a print operation. This enables the seamless continuation of control for maintaining the reliability of the printhead, such as a preliminary discharge or temperature adjustment.

Note that a single function printing apparatus mounted with a full-line printhead is exemplified in the embodiment described above. However, the present invention is not limited to this. For example, the present invention is also applicable to a multifunction printer apparatus (MFP) having a facsimile function and an image reading device (scanner function).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-211937, filed Nov. 1, 2017, which is hereby incorporated by reference herein in its entirety.

What is claimed is:

1. A printing apparatus comprising:
a printhead including arrayed print elements for printing an image on a print medium;
a conveyance unit configured to convey the print medium in a conveyance direction intersecting an arrayed direction of the print elements, wherein the printhead prints on the print medium while the print medium is conveyed by the conveyance unit;
a reception unit configured to receive, as serial data, a plurality of commands for driving the printhead to perform printing;
a first generation unit configured to internally generate a first latch signal for latching the serial data in the printing apparatus for a preparation operation prior to image printing by the printhead, based on a system clock of an integrated circuit of the printing apparatus;
a second generation unit configured to generate a second latch signal for latching image data included in the serial data for printing an image based on the image data on the print medium, based on information indicating a position of the conveyed print medium;
an extraction unit configured to extract each of the plurality of commands from the serial data received by the reception unit;
a drive unit configured to drive the printhead to perform the preparation operation prior to image printing by the printhead based on the first latch signal and to print an image based on the image data on the print medium based on the second latch signal, while switching over the first latch signal and the second latch signal by the integrated circuit, based on each of the plurality of commands extracted by the extraction unit; and
a control unit configured to perform a registration operation of the print medium conveyed by the conveyance unit based on the first latch signal upon start of the printing on the print medium, and control switchover to the second latch signal after disabling the first latch signal for a predetermined period upon switchover of the first latch signal to the second latch signal so as to ensure a data transfer time for transferring data to the printhead.

2. The apparatus according to claim 1, wherein the integrated circuit is an ASIC of the printing apparatus.

3. The apparatus according to claim 2, further comprising:
a detection unit configured to detect a position of the print medium conveyed by the conveyance unit,
wherein the second generation unit generates the second latch signal based on the position of the print medium detected by the detection unit.

4. The apparatus according to claim 3, wherein
the detection unit is an encoder which detects the position of the conveyed print medium, and
the second latch signal is generated based on an encoder signal output from the encoder.

5. The apparatus according to claim 4, wherein the control unit performs image printing by latching the image data included in the serial data by the second latch signal after the predetermined period, and when the printing is complete, switches over again to the first latch signal after a blank period based on the system clock.

6. The apparatus according to claim 4, wherein
the printhead includes a plurality of print elements arrayed in the arrayed direction, each of the plurality of print elements discharging ink in accordance with an inkjet method,
the plurality of print elements are electrothermal transducers, and
the preparation operation prior to image printing by the printhead includes temperature adjustment of the printhead and preliminary discharge of ink.

7. The apparatus according to claim 1, wherein the control unit disables the first latch signal by masking the first latch signal with a window for the predetermined period.

8. The apparatus according to claim 1, further comprising a monitor unit configured to monitor transfer of the serial data for the predetermined period.

9. The apparatus according to claim 8, wherein in a case in which monitoring of the monitor unit determines that the serial data is in transfer, the control unit temporarily masks the second latch signal until transfer completion of the serial data.

10. A print control method of a printing apparatus that prints an image, by a printhead including arrayed print elements, on a print medium while the print medium is conveyed in a convey direction intersecting an arrayed direction of the print elements, comprising:

receiving, as serial data, a plurality of commands for driving the printhead to perform printing;

internally generating a first latch signal for latching the serial data in the printing apparatus for a preparation operation prior to image printing by the printhead, based on a system clock of an integrated circuit of the printing apparatus;

generating a second latch signal for latching image data included in the serial data for printing an image based on the image data on the print medium, based on information indicating a position of the conveyed print medium;

extracting each of the plurality of commands from the received serial data;

driving the printhead to perform the preparation operation prior to image printing by the printhead based on the first latch signal and to print an image based on the image data on the print medium based on the second latch signal, while switching over the first latch signal and the second latch signal by the integrated circuit, based on each of the extracted plurality of commands;

performing a registration operation of the conveyed print medium, based on the first latch signal upon start of printing on the conveyed print medium; and controlling switchover to the second latch signal after disabling the first latch signal for a predetermined period upon switchover of the first latch signal to the second latch signal so as to ensure a data transfer time for transferring data to the printhead.

11. The method according to claim 10, wherein the integrated circuit is an ASIC of the printing apparatus.

12. The method according to claim 11, further comprising:

detecting a position of the conveyed print medium,
wherein the second latch signal is generated based on the detected position of the print medium.

13. The method according to claim 12, wherein
the position of the conveyed print medium is detected by an encoder, and
the second latch signal is generated based on an encoder signal output from the encoder.

14. The method according to claim 13, wherein in the control, image printing is performed by latching the image data included in the serial data by the second latch signal after the predetermined period, and when the printing is complete, switching over again to the first latch signal after a blank period based on the system clock.

15. The method according to claim 13, wherein
the printhead includes a plurality of print elements arrayed in the arrayed direction, each of the plurality of print elements discharging ink in accordance with an inkjet method,
the plurality of print elements are electrothermal transducers, and
the preparation operation prior to image printing by the printhead includes a temperature adjustment of the printhead and a preliminary discharge of ink.

16. The method according to claim 10, wherein in the control, the first latch signal is disabled by masking the first latch signal with a window for the predetermined period.

17. The method according to claim 10, further comprising monitoring transfer of the serial data for the predetermined period.

18. The method according to claim 17, wherein in the control, in a case in which the monitoring determines that the serial data is in transfer, the second latch signal is temporarily masked until transfer completion of the serial data.

* * * * *